(12) United States Patent
Papple et al.

(10) Patent No.: US 9,557,060 B2
(45) Date of Patent: Jan. 31, 2017

(54) COMBUSTOR HEAT SHIELD

(71) Applicant: Pratt & Whitney Canada Corp., Longueuil (CA)

(72) Inventors: Michael Papple, Verdun (CA); Robert Sze, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 264 days.

(21) Appl. No.: 14/305,404

(22) Filed: Jun. 16, 2014

(65) Prior Publication Data

US 2015/0362191 A1 Dec. 17, 2015

(51) Int. Cl.
*F23R 3/04* (2006.01)
*F23R 3/00* (2006.01)

(52) U.S. Cl.
CPC ............... *F23R 3/04* (2013.01); *F23R 3/002* (2013.01); *F23R 2900/03041* (2013.01)

(58) Field of Classification Search
CPC ... F23R 3/002; F23R 2900/03042; F23R 3/06; F23R 2900/03041; F23R 3/04; F23R 3/10
See application file for complete search history.

(56) References Cited

U.S. PATENT DOCUMENTS

| 5,271,219 | A | * | 12/1993 | Richardson | F23R 3/10 |
| | | | | | 60/39.11 |
| 5,956,955 | A | * | 9/1999 | Schmid | F23R 3/10 |
| | | | | | 60/748 |
| 6,751,961 | B2 | | 6/2004 | Pacheco-Tougas et al. | |
| 6,955,053 | B1 | | 10/2005 | Chen et al. | |
| 6,978,618 | B2 | | 12/2005 | Pacheco-Tougas et al. | |
| 7,506,512 | B2 | * | 3/2009 | Schumacher | F23R 3/12 |
| | | | | | 60/754 |
| 7,681,398 | B2 | | 3/2010 | Patel et al. | |
| 7,721,548 | B2 | | 5/2010 | Patel et al. | |
| 7,748,221 | B2 | | 7/2010 | Patel et al. | |
| 8,316,541 | B2 | | 11/2012 | Patel et al. | |
| 2014/0090402 | A1 | * | 4/2014 | Erbas-Sen | F23R 3/04 |
| | | | | | 60/806 |
| 2015/0345789 | A1 | * | 12/2015 | Papple | F23R 3/10 |
| | | | | | 60/772 |

* cited by examiner

*Primary Examiner* — Carlos A Rivera
*Assistant Examiner* — Stefan Ibroni
(74) *Attorney, Agent, or Firm* — Norton Rose Fulbright Canada LLP

(57) ABSTRACT

A heat shield for a combustor of a gas turbine engine has a heat shield adapted to be mounted to a combustor wall with a back face of the heat shield in spaced-apart facing relationship with an inner surface of the combustor wall to define an air space. Concentric rails extend from the back face of the heat shield across the air space surrounding a nozzle opening in the heat shield. Effusion holes are provided between the concentric rails and extend between the back and front faces. Fins may be placed between the effusion holes.

15 Claims, 5 Drawing Sheets

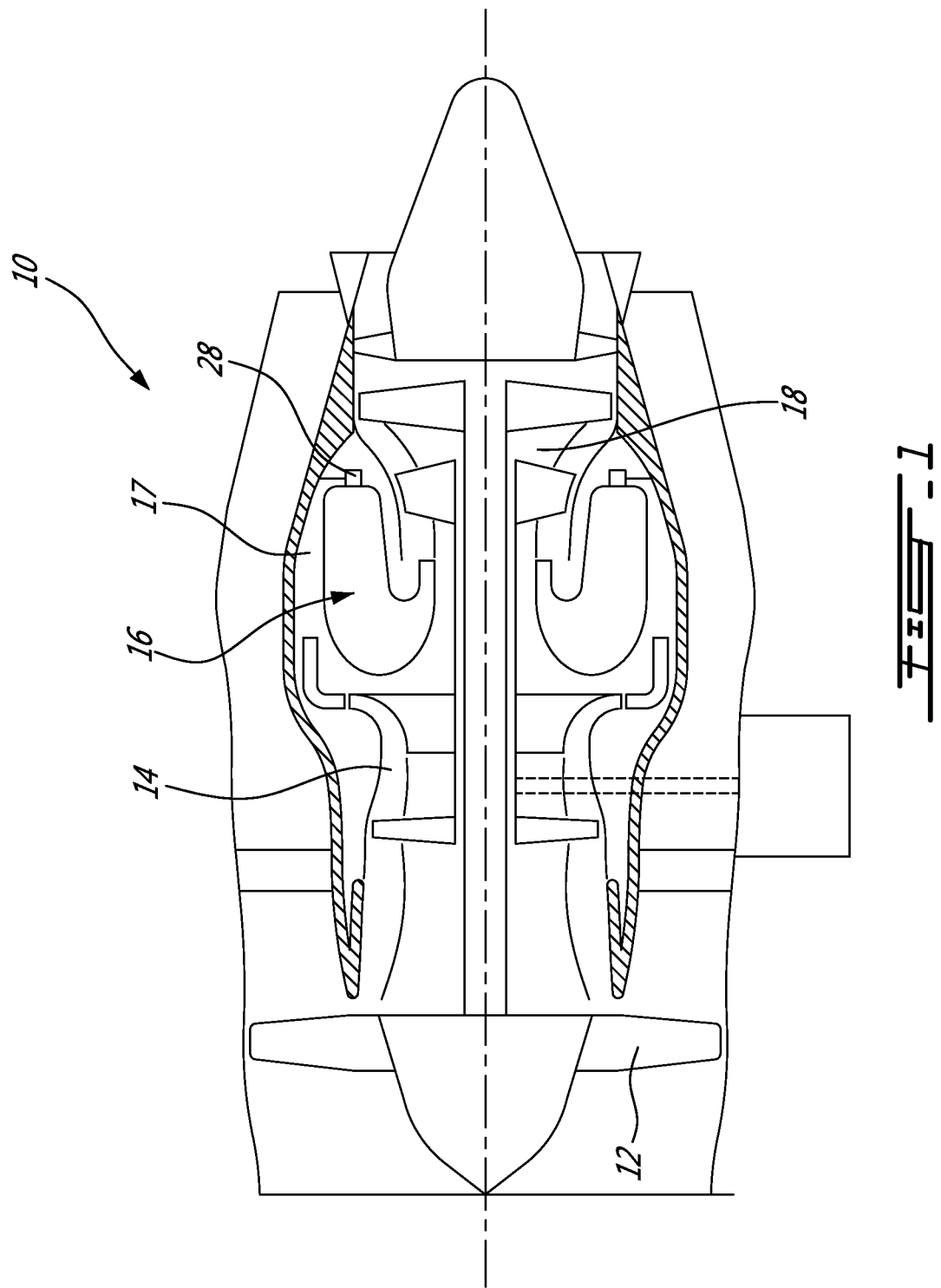

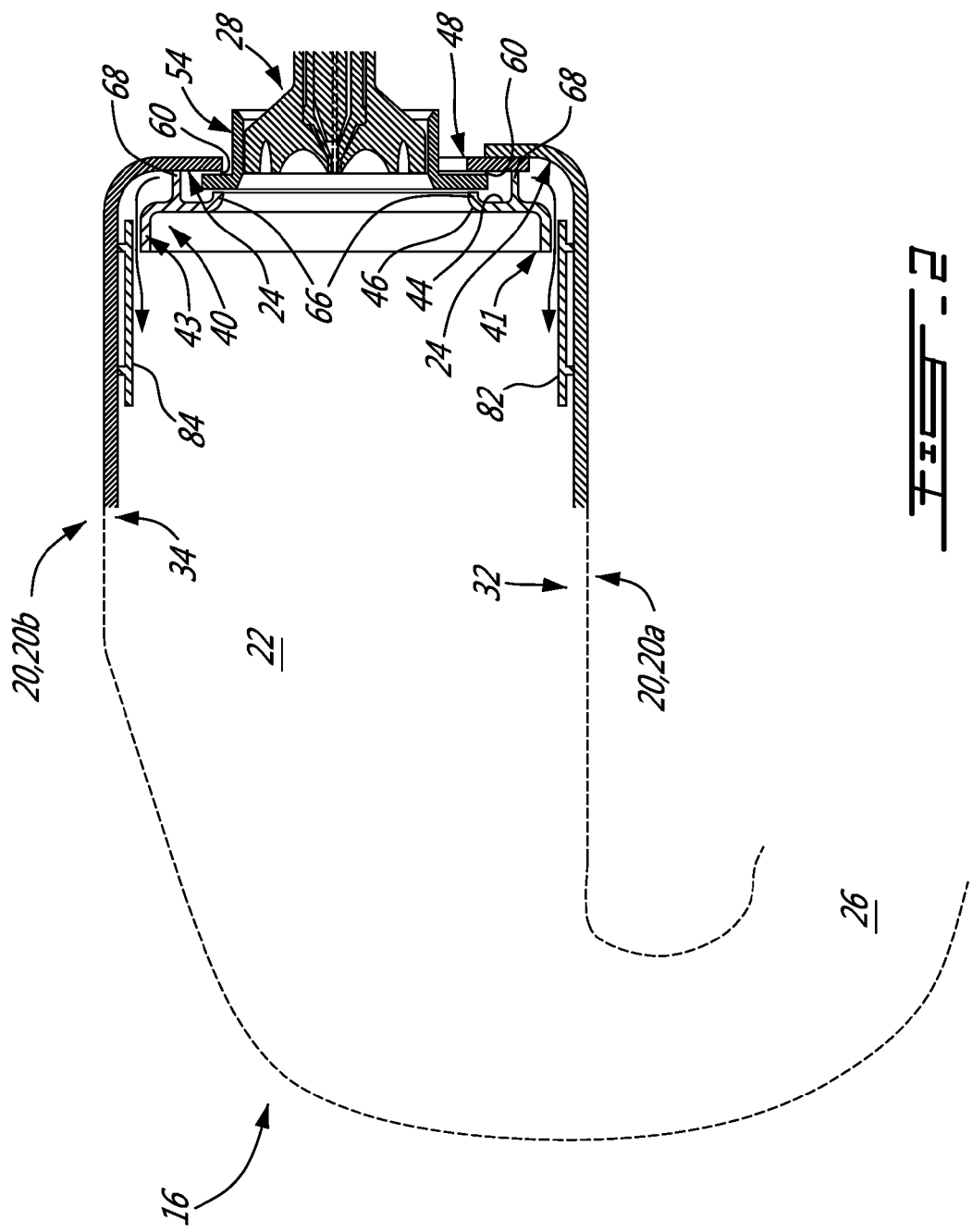

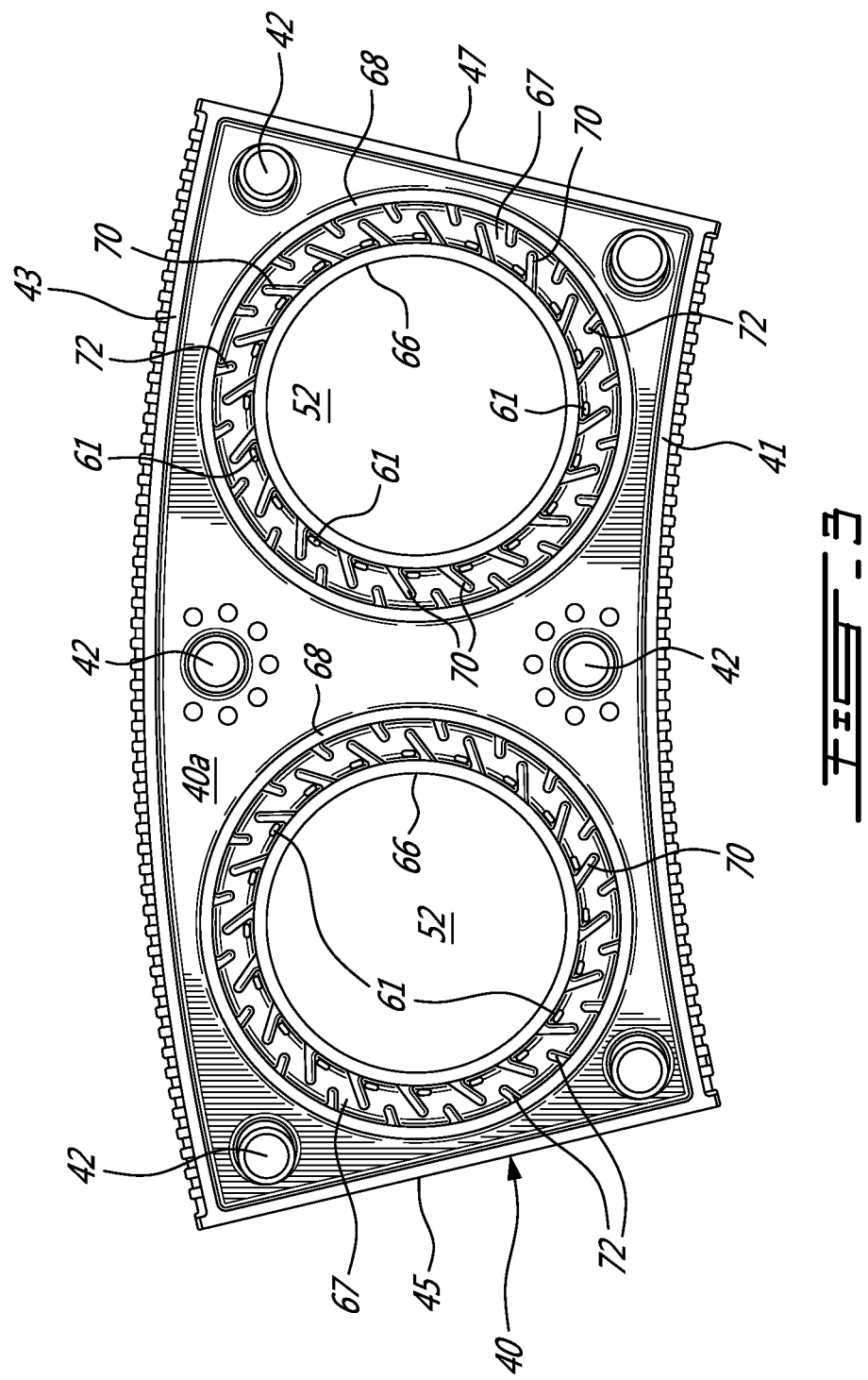

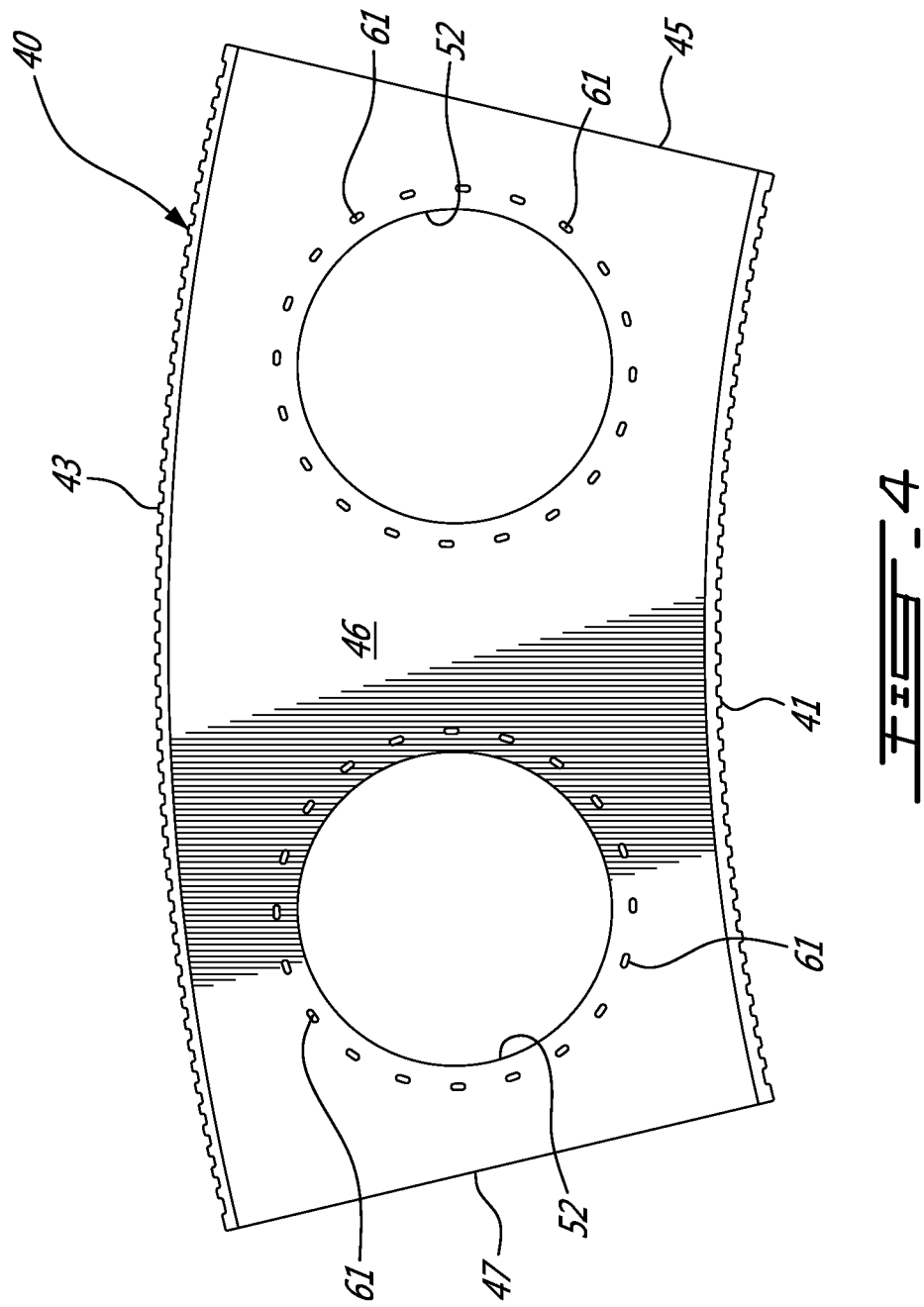

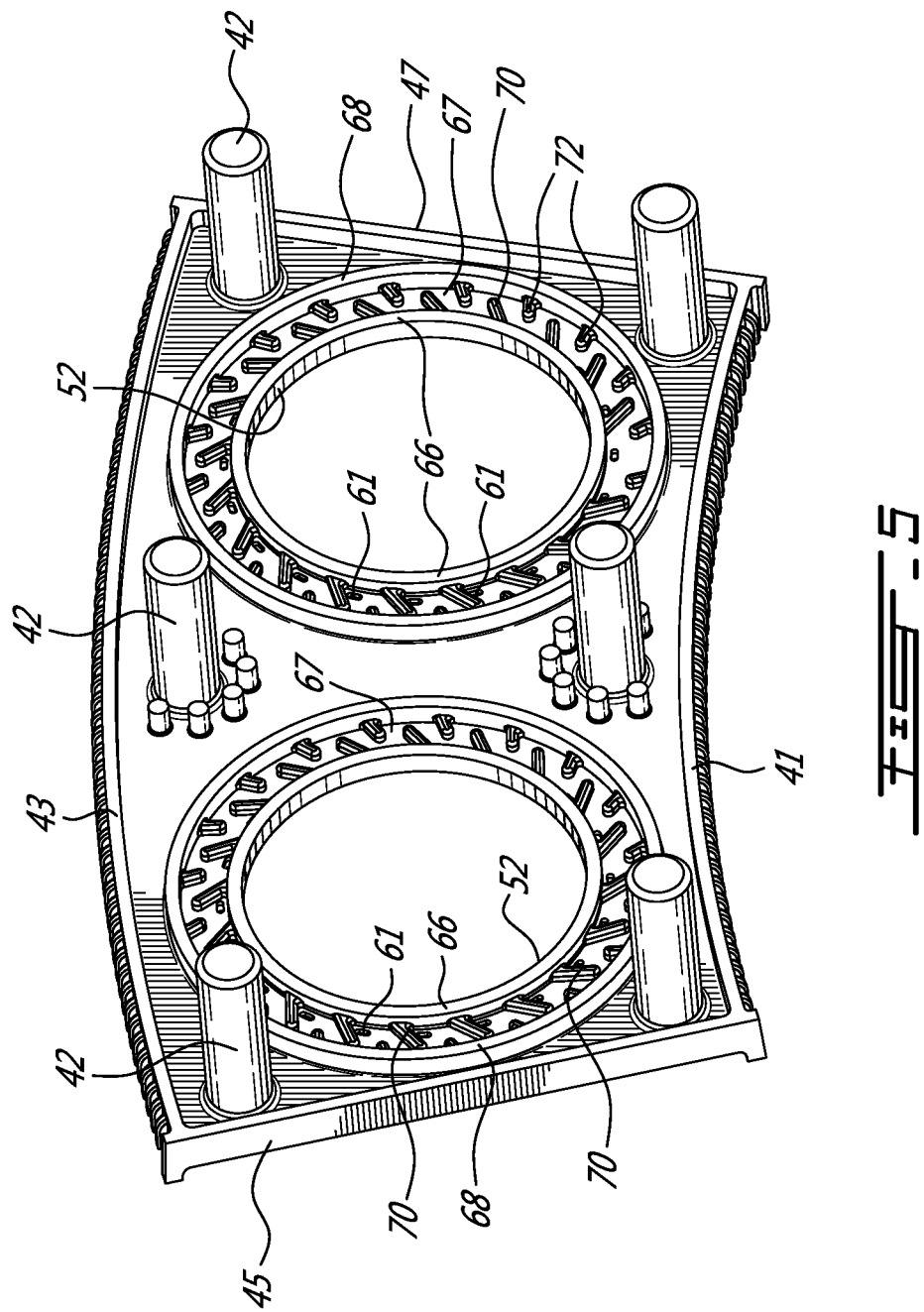

US 9,557,060 B2

COMBUSTOR HEAT SHIELD

TECHNICAL FIELD

The application relates generally to gas turbine engines and, more particularly, to combustor heat shields.

BACKGROUND OF THE ART

Heat shields such as those used to protect the combustor shells, are exposed to hot gases in the primary combustion zone. The amount of coolant available for cooling the heat shields must be minimized to improve the combustion efficiency and to reduce smoke, unburned hydrocarbon and CO/NOx emission.

There is a continuing need for improved heat shields and targeted cooling schemes.

SUMMARY

In one aspect, there is provided a heat shield for a combustor of a gas turbine engine, comprising a heat shield body adapted to be mounted to a combustor wall with a back face of the heat shield in spaced-apart facing relationship with an inner surface of the combustor wall to define an air gap between the heat shield body and the combustor wall, at least one nozzle opening defined in the heat shield body; rails extending from the back face of the heat shield body across the air gap, the rails including a pair of concentric, spaced apart rings defining a toroidal region and effusion holes located in the toroidal region and extending through the heat shield body and configured to pass cooling air from the back side to the front side of the heat shield.

In a second aspect, there is provided a method of cooling a combustor heat shield having front and back surfaces mounted in a combustor of a gas turbine engine, the method comprising: recuperating air leaking between a floating collar and a combustor dome portion, and directing the leakage air in a confined passage defined by a pair of concentric rails projecting from a back face of the heat shield; passing the air from the confined passage through effusion holes formed in the shield between the back and front surfaces and confined between the pair of concentric rails in order to pass the leakage air from the back surface to the front surface to promote the formation of a coolant air film over the front surface.

In a third aspect, there is provided a heat shield for a combustor of a gas turbine engine, comprising a heat shield body adapted to be mounted to a combustor wall with a back face of the heat shield body in spaced-apart facing relationship with an inner surface of the combustor wall to define an air gap between the heat shield body and the combustor wall, at least a fuel nozzle opening defined in said heat shield body, inner and outer concentric rails extending from the back face of the heat shield body across said air space surrounding the fuel nozzle opening, a plurality of effusion holes formed between the inner and outer rails and directed tangentially to the fuel nozzle opening and an elongated fin extending between adjacent effusion openings aligned tangentially to the nozzle opening and parallel to the adjacent effusion holes.

DESCRIPTION OF THE DRAWINGS

Reference is now made to the accompanying figures, in which:

FIG. 1 is a schematic cross-section view of a turbofan engine having a reverse flow annular combustor;

FIG. 2 is a schematic view of the combustor of the engine shown in FIG. 1;

FIG. 3 is a rear view of a combustor dome heat shield showing the back cold side of the heat shield;

FIG. 4 is a front view of the combustor dome heat shield showing the front hot side of the heat shield; and FIG. 5 is a rear isometric view of the back side of a segment of the combustor heat shield illustrating effusion holes and heat transfer augmentation features.

DETAILED DESCRIPTION

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. As shown in FIG. 2, the combustor 16 may comprise a reverse flow annular combustor shell 20 including a radially inner shell 20a and a radially outer shell 20b, defining a combustion chamber 22. The combustor 16 has a bulkhead or inlet dome portion 24. The combustor 16 further has an exit portion 26 for communicating combustion gases with the turbine section 18. As shown in FIG. 1, a plurality of fuel nozzles 28 are mounted to extend through the dome portion 24 of the combustor 20 to deliver a fuel-air mixture to the combustion chamber 22.

A plurality of impingement holes (not shown) may be defined in the inner and outer shells 20a and 20b for cooling purposes, and dilution holes (not shown) may also be provided for combustion purposes. Inner and outer shells 20a and 20b may have any suitable configuration and, thus, are shown in dotted line only in FIG. 2. The inner and outer shells 20a and 20b are typically made out of sheet metal, though any suitable material(s) and manufacturing method (s) may be used. A thermal barrier coating (not shown) may be applied to the inner or combustion facing surfaces 32, 34 of inner and outer front heat shields 82 and 84 to protect them against the high temperatures prevailing in the combustion chamber 22.

Referring to FIG. 2, it can be appreciated that circumferentially distributed dome heat shields 40 (only one shown in FIG. 2) are mounted to the dome portion 24 of the inner and outer shells 20a, 20b inside the combustion chamber 22 to protect the dome portion 24 from the high temperatures in the combustion chamber 22. The dome heat shields 40 are typically castings made out of high temperature capable materials. Each dome heat shield 40 has a plurality of threaded studs 42 (six according to the example shown in FIGS. 3 and 5) extending from a back face of the heat shield and through corresponding mounting holes (not shown) defined in the combustor dome. Self-locking nuts (not shown) are threadably engaged on the studs 42 from outside of the combustion chamber 22 for holding the dome heat shields 40 tightly against the combustor dome.

As shown in FIG. 2, circumferentially spaced-apart fuel nozzle openings 48 are defined through the combustor dome portion 24 for allowing mounting of the fuel nozzles 28 to the combustor 16. At least one corresponding fuel nozzle opening 52 (two in the example illustrated in FIG. 3) is defined in each of the dome heat shields 40 and is aligned with a corresponding fuel nozzle opening 48 in the combustor dome portion 24 for accommodating an associated fuel nozzle therein. The provision of two or more fuel nozzle openings 52 in each heat shield 40 reduces the number of heat shields required to cover the dome portion 24, the number of studs 42, rail, air coolant leakage, cost and weight when compared to dome heat shields for a single fuel nozzle.

As illustrated in FIG. 2, a floating collar 54 is mounted in each nozzle opening 48 in the combustor shell 20 to provide sealing between the combustor shell 20 and the fuel nozzles 28 while allowing relative movement therebetween. The fuel nozzles 28 are slidably received in the floating collars 54. The floating collars 54 are axially trapped between the dome heat shields 40 and the dome portion 24 of the inner and outer combustor shells 20*a*, 20*b*. The fuel nozzle openings 48 are slightly oversized relative to the floating collars 54, thereby allowing limited radial movement of the collars 54 with the fuel nozzles 28 relative to the combustor shell 20.

Each dome heat shield 40 has a back face 44 and a front face 46. As shown in FIG. 2, the back face 44 is the cool side of the shield 40, facing the dome portion 24, while the front face 46 is the hot side, facing the combustion chamber. The shield 40 is spaced from the dome portion 24 so that the back face 44 defines a cooling air space. Relatively cool air from plenum 17 is admitted in the air space. Impingement hole patterns are arranged in the dome portion 24 of the combustor shell 20 to optimize the heat shield cooling. Heat exchange promoting structures and rails and pins may be strategically positioned on the back face 44 of the heat shields 40 to locally promote enhanced cooling in targeted or most thermally solicited areas of the heat shields as described in U.S. Pat. No. 7,721,548 to Patel et al issued May 25, 2010, the content of which is herewith incorporated by reference.

Now referring concurrently to FIGS. 3 to 5, it can be seen that each individual heat shield 40 is provided in the form of a circular sector having radially inner and outer lips 41, 43 projecting forwardly from the front face 46 of the heat shield between lateral edges 45, 47. Rails integrally extend from the back face 44 of the heat shields 40 to strengthen the heat shield and direct the flow of cooling air as desired. Some of the rails may extend from the heat shield back face 44 all the way into sealing contact with the inner surface of the combustor dome portion 24 and, thus, more or less act as sealing rails to compartmentalize the air space, thereby directing the cooling air to targeted regions of the dome heat shields.

The rails may also include a pair of concentric rails or rings 66 and 68 about each fuel nozzle opening 52. A circular row of effusion holes 61 may be provided at the base of each ring 66 concentrically about each fuel nozzle opening 52 for allowing leakage air flowing through a gap 60 between the floating collars 54 and the dome portion 24 to flow through the dome heat shield 40 to provide for the formation of a cooling film over the front face of the dome heat shield 40. These effusion holes 61 are arranged in a toroidal region 67 between inner and outer rails 66, 68 with a tangential component, relative to the nozzle opening 52, so that the angle of the axis of the holes 61, to the hot or front side 46 of the shield, can be shallow; e.g. 20° to 35° to the plane of the heat shield. The holes 61 are oriented so that after leaving the holes the coolant air 'swirls' around the fuel nozzle opening 52. The holes are disposed so as to the clear the outer rail 68. By clearing the outer rail 68, we mean that a laser beam used to form the effusion holes 61 clears the outer ring 68. Such use of otherwise wasted leakage air advantageously contributes to minimize the amount of cooling air required for the heat shields 40.

Elongated fins 70 are located between the rails 66, 68 and are arranged tangentially between and generally in the same direction as the effusion holes 61. The fins 70 have a height equal to or less than the height of the inner rail 66 so that the floating collar 54 can contact with and seal the inner rail 66. The fins 70 also act to enhance the flow of cooling air through the effusion holes 61. The shape of the fins 70 are dictated by aerodynamic considerations and tend to be elongated, as shown in FIGS. 3 and 5. Fins 72 are also provided in the toroidal region 67 but spaced outwardly from the effusion holes 61 and fins 70. The purpose of the fins 72 is to promote turbulence of the cooling air within the toroidal region 67 and to add greater heat transfer area. Fins 72 are circumferentially staggered relative to fins 70. The fins 70 and 72 may be provided as two concentric arrays of circumferentially spaced-apart fins.

As mentioned herein above, the effusion holes 61 may be made by lasering. The laser beam is pointed toward the hot side of the dome heat shield 40. The beam passes through the thermal barrier coating on the hot side, then passes through the dome heat shield metal. The resulting holes should have a shallow angle to the surface (20 to 35 degrees according to one embodiment). When the holes 61 are lasered, it is desirable for the laser beam not to strike and remove material off the outer ring 68 and the fins 70, 72. This beam should be oriented to "miss" or "clear" these features.

In operation, coolant air from the plenum 17 leaks to the gap 60 from between each floating collar 54, the combustor dome portion 24 and the shield 40. This leakage air is recuperated and guided to cool the combustor heat shield 40. At each floating collar leakage site, a portion of the leakage air passes through the effusion holes 61, with the help of the fins 70, near the fuel nozzle openings 52 to provide for the formation of a film of coolant air over the front face 46 of the heat shield 40. The dome heat shield near the effusion holes 61 are cooled by convection, i.e. the coolant passing through the holes 61 is lower in temperature than the dome heat shield metal surrounding the holes. After leaving the effusion holes 61 the coolant air also provides a cooling film on the front hot surface of the heat shield 40.

The above description is meant to be exemplary only, and one skilled in the art will recognize that changes may be made to the embodiments described without departing from the scope of the invention disclosed. For example, the invention can be provided in any suitable heat shield configuration and in any suitable combustor configuration, and is not limited to application in turbofan engines. It is understood that the principles of the inventions are not limited to combustor dome heat shields. For instance, the effusion holes and fins could be applied to other types of the combustor heat shields. Still other modifications which fall within the scope of the present invention will be apparent to those skilled in the art, in light of a review of this disclosure, and such modifications are intended to fall within the appended claims.

What is claimed is:

1. A heat shield for a combustor of a gas turbine engine, comprising a heat shield body adapted to be mounted to a combustor wall with a back side of the heat shield body in spaced-apart facing relationship with an inner surface of the combustor wall to define an air space between the heat shield body and the combustor wall, at least one nozzle opening defined in the heat shield body; rails extending from the back side of the heat shield body across the air space, the rails including a pair of concentric, spaced apart rings defining a toroidal region, effusion holes located in the toroidal region and through the heat shield body and configured to pass cooling air from the back side to a front side of the heat shield, and elongated fins interspersed between the effusion holes in the toroidal region, wherein each fin of the elongated fins are extending from one ring of the spaced apart rings, and wherein each fin are arranged in the toroidal region extending with a tangential component relative to the nozzle opening.

2. The heat shield defined in claim 1, wherein the effusion holes each has an axis aligned tangentially to the nozzle opening.

3. The heat shield defined in claim 2, wherein the axis of each effusion hole extends at a shallow angle of between 20° and 35° to the plane of the heat shield.

4. The heat shield defined in claim 1, wherein each elongated fin is disposed between adjacent effusion holes.

5. The heat shield defined in claim 1, wherein the pair of concentric rings includes an inner ring located at the periphery of the nozzle opening and an outer ring.

6. The heat shield defined in claim 5, wherein the inner ring and the elongated fins are at a height wherein the inner rail and fins come into contact with selected components of the dome.

7. The heat shield defined in claim 6, wherein the selected components includes a floating collar surrounding the nozzle.

8. The heat shield defined in claim 6, wherein the outer ring has a height greater than the inner ring and is adapted to contact the dome so as to form an annular cooling air gap with the inner ring and the dome for the purpose of receiving cooling air from beyond the dome and passing through openings in the dome.

9. The heat shield defined in claim 4 wherein the elongated fins comprises an outer row of fins for promoting air turbulence within the toroidal region.

10. A heat shield for a combustor of a gas turbine engine, comprising a heat shield body adapted to be mounted to a combustor wall with a back face of the heat shield body in spaced-apart facing relationship with an inner surface of the combustor wall to define an air space between the heat shield body and the combustor wall, at least one fuel nozzle opening defined in the heat shield body, inner and outer concentric rails extending from the back face of the heat shield body across the air space surrounding each fuel nozzle opening, a plurality of effusion holes formed between the inner and outer rails and directed tangentially to the respective fuel nozzle opening, and elongated fins extending between adjacent effusion openings, each fin of the elongated fins are extending from at least one of the inner and outer rails towards an opposite one of the inner and outer rails and wherein each fin are arranged in the toroidal region extending with a tangential component relative to the nozzle opening.

11. The heat shield defined in claim 10, wherein the axis of each effusion hole is in the range of 20° and 35° to the plane of the heat shield.

12. The heat shield defined in claim 10, wherein the fins include first and second rows of circumferentially spaced-apart fins, the fins of the second row being circumferentially staggered relative to the fins of the first row.

13. The heat shield defined in claim 12, wherein the second row surrounds the first row, and wherein the fins of the second row are shorter than the fins of the first row.

14. The heat shield defined in claim 13, wherein the fins of the second row project inwardly from the outer rail, and wherein the fins of the first row project outwardly from the inner ring.

15. A heat shield for a combustor of a gas turbine engine, comprising: a heat shield body adapted to be mounted to a combustor wall with a back face of the heat shield body in spaced-apart facing relationship with an inner surface of the combustor wall to define an air space between the heat shield body and the combustor wall, at least one fuel nozzle opening defined in the heat shield body, inner and outer concentric rails extending from the back face of the heat shield body and surrounding the at least one fuel nozzle opening, a plurality of effusion holes extending through the heat shield body between the inner and outer rails, and elongated fins extending from the back face of the heat shield body between the inner and outer rails, the elongated fins including first and second rows of circumferentially spaced-apart fins, the fins of the second row being circumferentially staggered relative to the fins of the first row, wherein the second row surrounds the first row, and wherein the fins of the second row are shorter than the fins of the first row.

* * * * *